United States Patent
Mitchell et al.

[15] 3,655,344
[45] Apr. 11, 1972

[54] TREATMENT OF TITANIUM TETRACHLORIDE DRIER RESIDUE

[72] Inventors: Robert F. Mitchell; Gordon A. Carlson, both of New Martinsville, W. Va.

[73] Assignee: PPG Industries, Inc., Pittsburgh, Pa.

[22] Filed: Sept. 2, 1969

[21] Appl. No.: 854,597

[52] U.S. Cl. ................................. 23/299, 23/300, 23/305, 23/312, 23/51, 23/56, 210/42
[51] Int. Cl. ................. B01d 9/02, B01d 11/02, C01g 31/00
[58] Field of Search ................. 23/87, 305, 300, 51, 56, 145, 23/61, 183, 299, 300, 296, 297, 312; 210/37, 38, 42

[56] References Cited

UNITED STATES PATENTS

| | | | |
|---|---|---|---|
| 2,839,359 | 6/1958 | Dunning | 23/145 X |
| 2,868,622 | 1/1959 | Bennett | 23/87 T |
| 2,890,100 | 6/1959 | Davis | 23/87 T |
| 2,905,530 | 9/1959 | Gregoire | 23/87 T |
| 3,371,034 | 2/1968 | Richards | 23/145 |

OTHER PUBLICATIONS

Hoover, Industrial and Engineering Chemistry, Vol. 33, No. 1, Jan., 1941, pages 131–134.
Hodges, Metal Finishing, Oct. 1953, pages 60–64.

Primary Examiner—Norman Yudkoff
Assistant Examiner—S. J. Emery
Attorney—Chisholm and Spencer

[57] ABSTRACT

The production of titanium tetrachloride by chlorination of titaniferous ores is described. Drier residue obtained from treatment of impure titanium tetrachloride is further treated with water and alkaline reagent to insolubilize vanadium and chromium values present in said residue.

7 Claims, 1 Drawing Figure

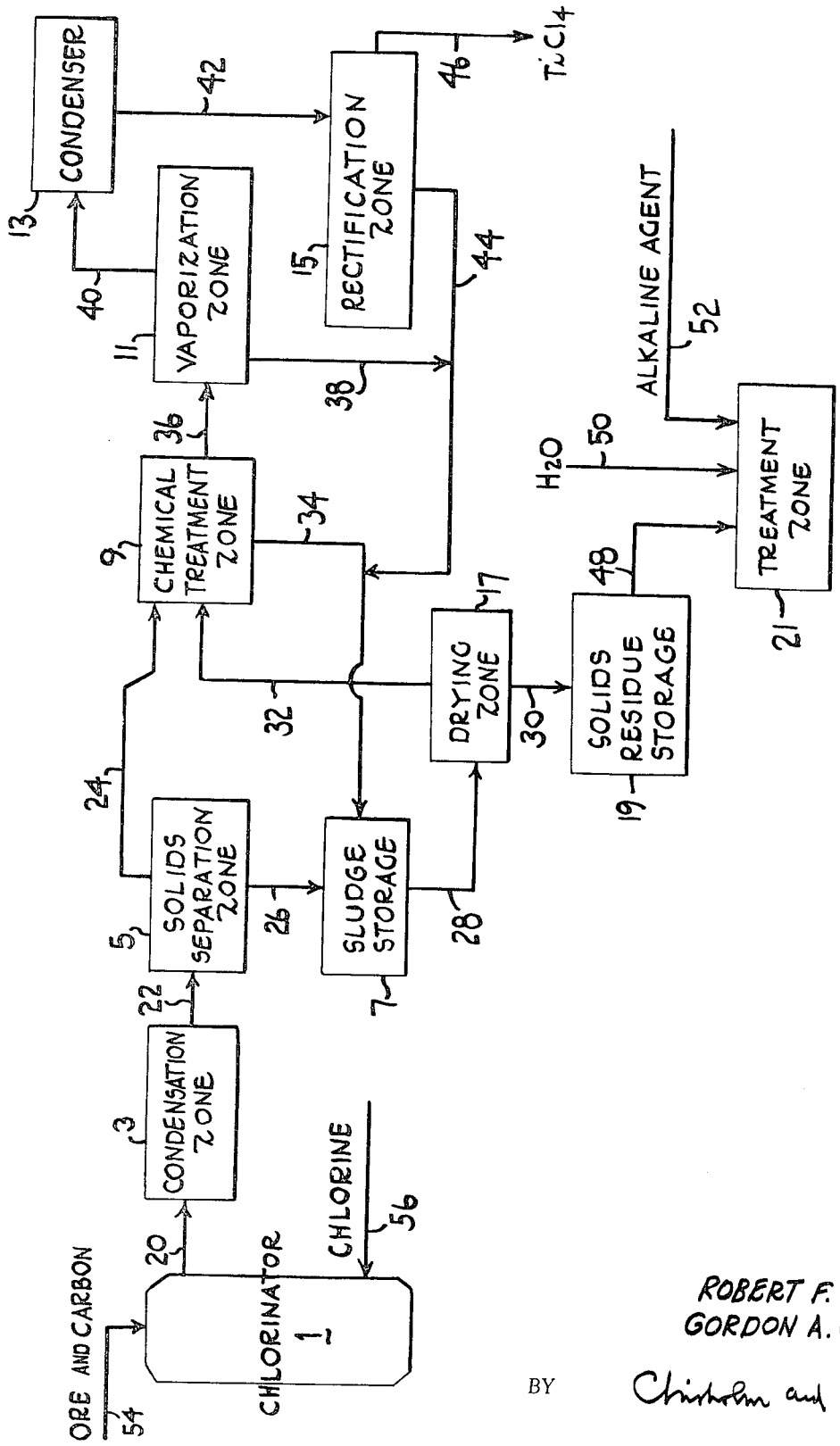
INVENTORS
ROBERT F. MITCHELL
GORDON A. CARLSON
BY Chisholm and Spencer
ATTORNEYS

TREATMENT OF TITANIUM TETRACHLORIDE DRIER RESIDUE

BACKGROUND OF THE INVENTION

In the manufacture of titanium tetrachloride, it is customary to chlorinate a titanium-containing ore, such as ilmenite, rutile or the like, in the presence of carbon or other carbonaceous material at high temperatures. In addition to titanium tetrachloride, the reaction product mixture is comprised of carbon monoxide, carbon dioxide, chlorine, hydrogen chloride, phosgene, as well as the chlorides and oxychlorides of the metallic and non-metallic impurities present in the ore or carbonaceous material. The reaction product mixture is condensed and purified by several vaporization and/or rectification steps. Some of the metallic chlorides and oxychlorides in the reaction product mixture have boiling points close to titanium tetrachloride and are not readily eliminated therefrom by fractional distillation. It has, therefore, become customary to treat the crude condensed titanium tetrachloride with various chemical agents prior to rectification. The residue from the aforementioned vaporization, chemical treatment and rectification steps are typically combined and are referred to as "sludge." Since the sludge has a considerable amount of recoverable titanium tetrachloride, the sludge is dried and the recovered titanium tetrachloride recycled back into the main process. Typically, the dry solids (drier residue) remaining after drying are discarded, such as by dumping the solids into waste ponds.

The chlorides of vanadium and chromium present in the residue are leachable with water and, therefore, are eventually removed from the solids residue by rain water or water present in the waste pond. The run-off from the waste pond or waste disposal area often leads directly or indirectly to streams, rivers, etc. If sufficiently large, this run-off could contaminate the body of water into which it flowed with toxic compounds of vanadium and chromium. It, therefore, is necessary to further treat titanium tetrachloride drier residue in order to prevent any potential contamination problem.

BRIEF SUMMARY OF THE INVENTION

It has now been discovered that the vanadium and chromium values present in titanium tetrachloride drier residue can be insolubilized by water leaching followed by raising the pH of the resulting leach solution to at least 4, but less than 12. Preferably, the pH of the leach solution is raised to from about 6 to about 8 and thereafter maintained at at least 4 but less than 12.

BRIEF DESCRIPTION OF THE DRAWING

The single Figure is a schematic of a process for producing titanium tetrachloride by chlorination of titaniferous ore and treatment of the impure titanium tetrachloride and drier residue produced thereby.

DETAILED DESCRIPTION

Titanium tetrachloride is commonly produced by reacting, at high temperatures, a titanium-bearing material, such as ilmenite, rutile or titanium-containing slag or like titaniferous material, with chlorine and a reducing agent such as carbon or other carbonaceous material in a static bed or fluosolids operation. The vaporous titanium tetrachloride removed with the reaction product mixture is condensed to form a crude titanium tetrachloride condensate. Since there are a number of elements in the raw material chlorinated, in addition to titanium, which react with chlorine to form volatile chlorides and which carry over with the titanium tetrachloride vapors, the titanium tetrachloride condensate, sometimes referred to as crude titanium tetrachloride, is impure. Some of the aforementioned volatile chlorides, other than titanium tetrachloride, found in the crude condensate include, for example, the chlorides of silicon, aluminum, niobium, tungsten, iron, manganese, magnesium, calcium, zirconium, vanadium and chromium.

One such chloride, which because of the proximity of its boiling point to titanium tetrachloride cannot be separated therefrom by fractional distillation, is vanadium chloride. The vanadium can be in the form of vanadium tetrachloride and/or vanadium oxychloride. Vanadium chloride is present in substantially all crude titanium tetrachloride condensate and comprises a major portion of the impurities in the condensate and, hence, is chiefly responsible for the yellowish color of crude titanium tetrachloride. By way of example, a typical crude titanium tetrachloride can comprise from 0.10 to 0.25 percent vanadium, based on the weight of the titanium tetrachloride.

In addition to the products of the chlorination reaction, solids including ore and carbonaceous reductant, are also carried over into the primary condenser. Following condensation, these solids are separated from the condensate by, for example, vaporization or settling, and these solids removed to sludge storage.

A number of methods have been proposed whereby purified titanium tetrachloride can be obtained from the chlorination product mixture. These methods include treatment of the crude titanium tetrachloride with various chemical agents followed by distillation. Chemical treating agents disclosed in the art include sulfur, hydrogen sulfide, rubber, chlorinated hydrocarbons, various organic compounds and particularly oils of mineral, animal and vegetable origin, soaps, metals either alone or in combination with alkaline agents, powdered iron, metal hydrides, etc. The exact manner in which the aforementioned chemical agents function is not known completely; however, they act to remove vanadium and other impurities which cannot be separated readily from the titanium tetrachloride by distillation alone.

Following chemical treatment of the crude titanium tetrachloride, the liquid phase is vaporized and the solids residue, which usually contains titanium tetrachloride, is removed to sludge storage. Condensate from the aforementioned vaporization is sent to a rectification zone where water white, pure titanium tetrachloride is produced. Solids residue from the preceding vaporization and/or rectification zones is removed to sludge storage.

While it is possible to continue vaporization and rectification in the aforementioned steps until a dry solid residue is obtained, this is not done in practice for several reasons. First, it is difficult to remove such solid residue from the equipment used and, second, during evaporation to dryness, thermocracking of the residue can in some cases take place thereby releasing impurities into the titanium tetrachloride and contaminating the product. The various residues transferred to sludge storage contain recoverable titanium tetrachloride and for this reason are often referred to as "purification sludge," largely due to their consistency.

The aforementioned purification sludge, which is a suspension of solids in titanium tetrachloride, is transferred to a drier which is operated to separate titanium tetrachloride from the suspended solids and other impurities. Operation of the drier can be accomplished by a simple volatilization of the titanium tetrachloride. The solid residue is discarded usually and the titanium tetrachloride vapors condensed, preferably, and then fed back into the process scheme. The solids remaining after volatilization of the titanium tetrachloride will be referred to hereinafter as titanium tetrachloride drier residue. As noted above, this residue is made up of residual material obtained from initial separation of solids from the crude titanium tetrachloride removed from the chlorinator, chemical treatment, vaporizers and fractional distillation columns. One or more, but not all, of the aforementioned residuals can be eliminated, depending on the particular process employed to produce titanium tetrachloride.

For a more complete understanding of this invention, reference will now be made to the drawing, which is a schematic of a process for producing titanium tetrachloride and for treatment of titanium tetrachloride drier residue. It will be apparent, however, that this particular embodiment can be widely varied without departing from the concepts described herein.

Referring now to the drawing, ore, carbon and chlorine are introduced into chlorinator 1, as indicated by lines 54 and 56 respectively. Product vapors, together with entrained solids from the chlorinator are removed from chlorinator 1 to condensation zone 3 as indicated by line 20. The resulting slurry is transferred to solids separation zone 5 as indicated by line 22. Liquid effluent from said separation zone is removed to chemical treatment zone 9, as indicated by line 24, while solids from separation zone 5 are removed to sludge storage 7, as indicated by line 26. The liquid effluent from chemical treatment zone 9 is removed to vaporization zone 11, as indicated by line 36, while the residuum from chemical treatment zone 9 is removed to sludge storage 7, as indicated by line 34. Vaporous effluent from vaporization zone 11 is removed to condenser 13, as indicated by line 40, while the residuum from vaporization zone 11 is removed to sludge storage, as indicated by line 38. The condensate from condenser 13 is transferred to rectification zone 15, as indicated by line 42, wherein pure titanium tetrachloride is produced and removed therefrom, as indicated by line 46, while residuum from rectification zone 15 is removed to sludge storage zone 7 as indicated by line 44.

The accumulation of residuum in sludge storage 7 is removed to drying zone 17, as indicated by line 28, wherein recoverable titanium tetrachloride is vaporized, condensed in a condenser (not shown), and recycled to chemical treatment zone 9, as indicated by line 32. The dry solids residue remaining in drying zone 17 is removed to solids residue storage 19 as indicated by line 30.

It has been customary to discard the solids residue accumulated in solids residue storage 19 because of the economics involved in the recovery of metal values, such as vanadium and chromium, contained therein. However, the chlorides of vanadium and chromium present in this residue are water leachable and can potentially find their way via waste water disposal streams into rivers, ponds, etc., where their presence would present a contamination problem because of their toxicity. It is, therefore, necessary to remove these toxic elements before disposal of the residue so that waste water streams resulting from their disposal contain less than about 2 parts per million hexavalent chromium or pentavalent vanadium and less than about 5 parts per million trivalent chromium or tetravalent vanadium.

It has now been discovered that vanadium and chromium values, which is defined herein as the total amount of metallic vanadium and chromium present in the titanium tetrachloride drier residue, can be substantially removed from the residue and insolubilized by a simple additional process treatment.

In accordance with the present process and with further reference to the drawing, drier solids residue is removed to treatment zone 21 as indicated by line 48 wherein the solids are contacted with water and alkaline agent in accordance with the process further described herein, as indicated by lines 50 and 52 respectively. Treatment zone 21 can be a treatment tank, waste pond or any other suitable piece of process equipment. Although the drawing indicates the introduction of water into treatment zone 21, it is contemplated that the water already be present therein as, for example, in a waste pond. In treatment zone 21, the vanadium and chromium values present in the titanium tetrachloride drier residue are leached with water. Subsequently, the pH of the leach solution, which is less than 1 because of the presence therein of the chlorides and oxychlorides of vanadium and chromium as well as other metal halides leached from the residue, is raised with alkaline reagent to a pH of above about 4 and below about 12. Preferably, the pH is initially raised to from about 6 to about 8, and most preferably is raised to a pH of about 7. By this most preferred treatment, substantially all, i.e.,>99 percent, of the vanadium and chromium values are insolubilized, presumably as hydrated oxide precipitates. The remaining supernatant aqueous phase can be discarded into a waste water disposal stream.

Aqueous leaching of vanadium and chromium values from titanium tetrachloride drier residue can be performed in any convenient manner, i.e., the residue, water and alkaline reagent can be admixed in any convenient sequence. For example, the residue can be added to a treatment tank followed by the addition of water and alkaline reagent; the residue can be added to a tank or pond already containing water and alkaline reagent; or, the residue and water and/or alkaline reagent can be admixed simultaneously. Typically, the residue and alkaline reagent are added simultaneously to a volume of water in the treatment area, e.g., pond, so that the pH remains substantially the same, i.e., neutral. This method avoids localized acidity and prevents localized resolubilization of the chromium and vanadium previously insolubilized.

The amount of water used to leach vanadium and chromium values from the aforesaid residue can vary broadly and should be sufficient to furnish fluidity to the treatment system, i.e., to provide intimate contact of the residue with water. Typically, the residue should not represent more than 10 weight percent of the treatment water in order to provide adequate leaching action; however, if the residue is relatively low in metal, e.g. iron, content, the residue can be leached effectively with smaller amounts of water so that the residue represents more than 10 weight percent of the treatment water. Following insolubilization of the chromium and vanadium values in the titanium tetrachloride drier residue in accordance with the above-described process, it is advantageous to dilute the leach solution 15 to 20 times with water in order to facilitate the settling of the insolubilized metal values.

Any suitable alkaline reagent or combination of alkaline reagents can be used to raise the pH of the leach solution. Exemplary of alkaline reagents which can be employed are Group I and Group II hydroxides, carbonates, bicarbonates, and Group II metal oxides, such as sodium hydroxide, sodium carbonate, sodium bicarbonate, potassium hydroxide, potassium carbonate, potassium bicarbonate, calcium, barium and magnesium oxides, hydroxides and their carbonate salts, and ammonia or ammonium hydroxide. Typically, the cheapest available alkaline material, such as a waste stream having sufficient alkalinity to raise the pH of the drier residue leach solution to the desired level, is used. In addition to the above-mentioned alkaline reagents, there can be mentioned impure caustic, such as cell liquor which contains sodium hydroxide and sodium carbonate, barium waste streams containing barium oxide, barium hydroxide and barium carbonate, and waste streams containing calcium carbonate and magnesium hydroxide.

As indicated above, the pH of the leach solution is raised from less than 1 to from above about 4 to below about 12. Preferably, the pH is raised to between about 6 and about 8, most preferably about 7, and then maintained within the pH range of from 4 to 12. The greatest amount of insolubilization of vanadium and chromium values, i.e., greater than 99 percent, occurs when the pH of the leach solution is initially raised to about 7. It has been found that at pH values greater than 12 and less than 4, vanadium, and to a lesser degree chromium, begins to redissolve. However, resolubilization does not appear to be of significance between the aforesaid pH levels of 4 and 12. Within this range, the chromium and vanadium in solution were each found to be less than 0.6 parts per million when the leach solution pH was initially raised to about 7.

The present process is more particularly described in the following examples which are intended as illustrative only since numerous modifications and variations therein will be apparent to one skilled in the art.

EXAMPLE I

Fifty (50) gram portions of a titanium tetrachloride drier residue composite containing 8.5 weight percent vanadium and 1.7 weight percent chromium were leached with various amounts of tap water for 15 or 30 minutes and the resulting slurries filtered. About 75 percent of the residue was water soluble. Analyses of the dark green filtrates for vanadium and chromium were performed. The results are tabulated in Table I.

TABLE I
WATER LEACHING OF DRIER RESIDUE

| Run No. | Water leach (Mls.) | Time (Min.) | Percent water soluble | |
|---|---|---|---|---|
| | | | V | Cr |
| 1 | 200 | 15 | 90.7 | 91.6 |
| 2 | 200 | 30 | 90.0 | 92.5 |
| 3 | 300 | 30 | 95.0 | 95.1 |
| 4 | 400 | 30 | 95.1 | 95.2 |
| 5 | 500 | 30 | 96.1 | 95.7 |
| 6 | 500 | 30 | 95.9 | 94.9 |
| 7 | 750 | 30 | 97.5 | 97.0 |
| 8 | 400* | 30 | 97.0 | 96.5 |

* Filter cake washed with 350 ml additional $H_2O$ to give a total filtrate of 750 ml.

Portions of the dark green filtrate from Runs 4, 5 and 7 in Table I were neutralized with 15 molar sodium hydroxide or 15 molar ammonium hydroxide which were added dropwise until the pH of the filtrate was raised from <1 to between 7 and 8. In each case, a colorless filtrate and voluminous, gelatinous residue were obtained after vacuum filtration. Results of the analyses of the filtrates for vanadium and chromium following vacuum filtration are tabulated in Table II.

TABLE II
BASIC TREATMENT AND FILTRATION OF LEACH SOLUTION FROM DRIER RESIDUE WATER LEACHING

| Run No. (from Table I) | Mls. $H_2O$ original leach | Base added | Filtrate (ppm) | |
|---|---|---|---|---|
| | | | V | Cr |
| 4 | 400 | $NH_4OH$ | <1 | <0.6 |
| 4 | 400 | NaOH | <1 | <0.6 |
| 5 | 500 | $NH_4OH$ | <1 | <1 |
| 5 | 500 | NaOH | <1 | <1 |
| 7 | 750 | $NH_4OH$ | <1 | <1 |
| 7 | 750 | NaOH | <1 | <1 |

The data of Table I show that both the vanadium and chromium values contained in the titanium tetrachloride drier residue are readily soluble regardless of whether 300 or 750 milliliters of tap water are used. The basic treatment of the aqueous slurry of titanium tetrachloride drier residue almost completely precipitates (greater than 99.9 percent) the vanadium and chromium values present in the liquid phase of the slurry (Table II).

EXAMPLE II

Fifty (50) gram portions of the titanium tetrachloride drier residue composite of Example I were stirred in 500 milliliter portions of tap water. While monitoring the stirred slurry on a pH meter, various amounts of about 19 molar sodium hydroxide, 15 molar ammonium hydroxide or cell liquor were added to different pH levels. Each mixture was stirred for thirty minutes and filtered. The filtrates were analyzed for vanadium and chromium. The results of such analyses are summarized in Table III.

TABLE III
FILTRATE ANALYSES AT VARIOUS pH LEVELS

| Base used | | pH | | Filtrate analysis (ppm) | |
|---|---|---|---|---|---|
| Type | (Mls.) | Slurry | Filtrate | V | Cr |
| 15 M $NH_4OH$ | 43 | 7.6 | | <0.5 | <0.1 |
| 15 M $NH_4OH$ | 125 | 11.0 | 10.5 | <0.5 | <0.1 |
| 19 M NaOH | 34.7 | 8 | 6.3 | <0.5 | 0.3 |
| 19 M NaOH | 36.3 | 10 | 9 | <0.5 | 0.1 |
| 19 M NaOH | 37.9 | 12 | 11.3 | 0.6 | <0.1 |
| 19 M NaOH | 41.5 | 13.5 | 12.9 | 5.9 | 0.1 |
| 19 M NaOH | 73 | 14 | 14 | 540 | 0.1 |
| 19 M NaOH | 96 | >14 | >14 | 1250 | <1.0 |
| Cell Liquor* | 170 | 7.5 | 5.8 | 0.5 | 0.1 |
| Cell Liquor* | 419 | 14 | 14 | 673 | 0.9 |

* About 12 weight percent NaOH.

The data of Table III show that excess alkaline agent should be avoided since at pH values greater than 12 vanadium, and to a much lesser degree chromium, begins to redissolve. However, so long as the slurry pH was maintained equal to or less than 12 and above 4, the amount of vanadium and chromium in solution were each less than 0.6 parts per million. Caustic treatment to a pH of 14 results in the solubilization of about 5 percent of the vanadium. Further addition of caustic caused further solubilization of the vanadium.

EXAMPLE III

Forty-three (43) milliliters of either 15 molar sodium hydroxide or 15 molar ammonium hydroxide were mixed with either 500 or 750 milliliters of tap water and added to 50 gram portions of the titanium tetrachloride drier residue composite of Example I. Each slurry, which had a resulting pH of from 7 to 8, was stirred for 30 minutes and filtered. In each case, the filtrate contained less than 1 part per million vanadium and chromium.

This example shows that a one-step treatment by adding the required alkaline agent and tap water to the drier residue is as effective in rendering the vanadium and chromium values present in the residue insoluble as did the procedure of water leaching followed by basic precipitation illustrated in Example I.

EXAMPLE IV

The filter cakes of Example III were reslurried in 500 ml. of water and acidified with concentrated hydrochloric acid to the pH levels shown in Table IV. The slurries were filtered and the filtrates analyzed for vanadium and chromium. The results of such analyses are summarized in Table IV.

TABLE IV
ACIDIFICATION OF BASIC-TREATED DRIER RESIDUE SLURRIES

| Base | Slurry pH | Filtrate pH | Filtrate Analysis (ppm) | |
|---|---|---|---|---|
| | | | V | Cr |
| NaPH | 6.9 | 5.4 | 0.2 | 0.2 |
| | 4 | 4 | 131 | 9.3 |
| $NH_3OH$ | 4.4 | 4.2 | 0.3 | 0.5 |
| | 3 | 3 | 48 | 4 |

The data of Table IV show that acidification below a pH of 4 should be avoided as the vanadium, and to a lesser degree, the chromium, begin to redissolve especially in the sodium hydroxide medium.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

What is claimed is:

1. A method for treating solid titanium tetrachloride drier residue containing water soluble chromium and vanadium values, which comprises, in combination, the steps of contacting said residue with water in an amount sufficient to leach vanadium and chromium values from said residue and form a leach solution, raising the pH of the leach solution by adding alkaline reagent thereto in an amount sufficient to adjust the pH to at least 4 but less than or equal to 12 and thereby precipitate vanadium and chromium values from said leach solution and produce a supernatant aqueous phase containing less than about 1 p.p.m. each of vanadium and chromium, and thereafter maintaining the pH of the aqueous phase within said pH range.

2. A method for treating solid titanium tetrachloride drier residue containing water soluble chromium and vanadium values, which comprises, in combination, adding said residue to a volume of water sufficient to leach vanadium and chromium values from said residue, said water having a pH of at least 4 but less than or equal to 12 and a supernatant aqueous phase having less than about 1 p.p.m. each of vanadium and chromium, adding alkaline reagent to said water in an amount sufficient to precipitate leached vanadium and chromium values and maintain the pH of the water within said range, and thereby maintain said concentration of vanadium and of chromium in the supernatant aqueous phase at less than about 1 p.p.m.

3. A method for removing and insolubilizing vanadium and chromium values contained in solid titanium tetrachloride drier residue, which comprises, in combination, the steps of admixing said residue with water in amounts sufficient to leach vanadium and chromium values from said residue and with alkaline reagent in amounts sufficient to give the water a pH of between 6 and 8, thereby precipitating leached vanadium and chromium values and producing a supernatant aqueous phase containing less than about 1 p.p.m. each of vanadium and chromium, and thereafter maintaining the pH of the water at from at least 4 but less than or equal to 12.

4. A method according to claim 1 wherein the pH of the leach solution is raised to between about 6 and about 8 and thereafter maintained at between about 4 and about 12.

5. A method according to claim 1 wherein the alkaline reagent is sodium hydroxide.

6. A method according to claim 1 wherein the amount of drier residue represents less than 10 weight percent of the amount of water used to leach the vanadium and chromium values from said residue.

7. A method according to claim 2 wherein the pH of the water is maintained at between about 6 and about 8.

* * * * *